US009810305B2

(12) United States Patent
Legner

(10) Patent No.: US 9,810,305 B2
(45) Date of Patent: Nov. 7, 2017

(54) GEARING DEVICE WITH SECONDARILY COUPLED POWER SPLIT

(71) Applicant: ZF Friedrichshafen AG, Friedrichshafen (DE)

(72) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 135 days.

(21) Appl. No.: 14/777,866

(22) PCT Filed: Feb. 18, 2014

(86) PCT No.: PCT/EP2014/053051
§ 371 (c)(1),
(2) Date: Sep. 17, 2015

(87) PCT Pub. No.: WO2014/146839
PCT Pub. Date: Sep. 25, 2014

(65) Prior Publication Data
US 2016/0281831 A1    Sep. 29, 2016

(30) Foreign Application Priority Data

Mar. 19, 2013    (DE) .................. 10 2013 204 747

(51) Int. Cl.
*F16H 47/04*    (2006.01)
*F16H 61/421*    (2010.01)
(Continued)

(52) U.S. Cl.
CPC ........... *F16H 47/04* (2013.01); *F16H 61/421* (2013.01); *F16H 61/431* (2013.01);
(Continued)

(58) Field of Classification Search
None
See application file for complete search history.

(56) References Cited

U.S. PATENT DOCUMENTS 4,976,664 A * 12/1990 Hagin .................. F16H 47/04
475/76
5,803,856 A    9/1998 Iino et al.
(Continued)

FOREIGN PATENT DOCUMENTS

DE          23 35 629 A1    1/1975
DE    10 2007 018 999 A1    10/2008
(Continued)

OTHER PUBLICATIONS

German Search Report Corresponding to 10 2013 204 747.9 dated Jul. 8, 2015.
(Continued)

*Primary Examiner* — Dirk Wright
(74) *Attorney, Agent, or Firm* — Davis & Bujold, PLLC; Michael J. Bujold

(57) ABSTRACT

A transmission device (1) with secondarily coupled power splitting in which part of an applied torque can be conducted, in a first power branch (3) at least by way of a hydrostatic system (4), and the other part of the torque can be conducted in a second power branch (5) via mechanical system (6), located between a transmission input (7) and a transmission output (8). The hydrostatic system (4) of the first power branch (3) includes at least one pump (12) and at least one motor (13) that is functionally connected to the pump by way of a hydraulic circuit, and both of the pump and motor are adjustable. The two power paths (3, 5) can be summed by a summing gear system (9). The pump (12) is made smaller than the motor (13).

13 Claims, 4 Drawing Sheets

(51) Int. Cl.
*F16H 61/431* (2010.01)
*F16H 37/08* (2006.01)
*F16H 39/00* (2006.01)

(52) U.S. Cl.
CPC ... *B60Y 2304/01* (2013.01); *F16H 2037/0866* (2013.01); *F16H 2037/0873* (2013.01); *F16H 2039/005* (2013.01); *F16H 2047/045* (2013.01); *F16H 2200/2005* (2013.01)

(56) References Cited

U.S. PATENT DOCUMENTS

| | | | | |
|---|---|---|---|---|
| 6,039,666 | A * | 3/2000 | Okuda | F16H 47/04 475/72 |
| 7,901,314 | B2 * | 3/2011 | Salvaire | F04B 9/02 475/72 |
| 8,262,525 | B2 * | 9/2012 | Legner | F16H 47/04 475/80 |
| 8,323,138 | B2 * | 12/2012 | Legner | F16H 47/04 475/80 |
| 8,328,676 | B2 * | 12/2012 | Legner | F16H 47/04 475/218 |
| 8,535,190 | B2 * | 9/2013 | Fischer | F16H 47/04 475/80 |
| 8,608,606 | B2 * | 12/2013 | Fischer | F16H 47/04 475/218 |
| 8,882,623 | B2 * | 11/2014 | Mutschler | F16H 47/04 475/72 |

FOREIGN PATENT DOCUMENTS

| | | |
|---|---|---|
| DE | 10 2007 047 194 A1 | 4/2009 |
| DE | 10 2008 001 613 A1 | 11/2009 |
| DE | 10 2010 001 698 A1 | 8/2011 |
| DE | 102010001697 A1 * | 8/2011 ............ F16H 47/04 |
| GB | 924 185 | 4/1963 |
| GB | 1 161 508 | 8/1969 |
| WO | 20091047036 A1 | 4/2009 |

OTHER PUBLICATIONS

International Search Report Corresponding to PCT/EP2014/053051 dated Apr. 7, 2014.
Written Opinion Corresponding to PCT/EP2014/053051 dated Apr. 7, 2014.
International Preliminary Report on Patentability Corresponding to PCT/EP2014/053051 dated Feb. 24, 2015.

* cited by examiner
GEARING DEVICE WITH SECONDARILY COUPLED POWER SPLIT This application is a National Stage completion of PCT/EP2014/053051 filed Feb. 18, 2014, which claims priority from German patent application serial no. 10 2013 204 747.9 filed Mar. 19, 2013.

FIELD OF THE INVENTION

The invention concerns a gearing device with secondarily coupled power split.

BACKGROUND OF THE INVENTION

Transmissions with power splitting are usually designed with a hydrostatic branch and a mechanical branch, which are summed by means of a summing gear system. Such power-splitting transmissions are known, for example, from DE 10 2007 047 194 A1 and DE 10 2008 001 613 A1. They are also known as CVT devices (Continuously-Variable Transmissions) and are transmissions having two or more driving ranges, which are used inter alia in machine tools and in vehicles. Vehicles made with such transmissions can be driven in the forward direction and in the reverse direction. Within the driving ranges, in each case a transmission ratio of a power-splitting transmission can be adjusted continuously. For this, the hydrostatic branch usually comprises a first hydrostatic unit and a second hydrostatic unit, whose stroke volumes are adjustable.

Disadvantageously, such power-splitting transmissions or transmission devices with secondarily coupled power splitting both entail high production costs and occupy considerable structural fitting space. The combination of these CVT transmissions in the drive-trains of vehicles having drive engines whose drive power is low, is only favored in some cases despite their many operational advantages.

SUMMARY OF THE INVENTION

Accordingly, the purpose of the present invention is to provide a transmission device with secondarily coupled power splitting, that is compact and inexpensive and by means of which a desired functionality can be obtained particularly in vehicle drive-trains having drive engines with lower power.

According to the invention, this objective is achieved with a transmission device having the characteristics described below.

In the transmission device with secondarily coupled power splitting according to the invention, part of an applied torque can be conducted in a first power branch by way of at least one hydrostatic device and the other part of the torque can be conducted by mechanical means, from a transmission input and a transmission output. The hydrostatic system of the first power branch comprises at least one pump and at least one motor functionally connected thereto by way of a hydraulic circuit, both of them being adjustable, and the two power branches can be summed by means of a summing gear system.

According to the invention, the pump is smaller than the motor, whereby compared with known transmission devices whose hydrostatic system is made with hydrostatic units of equal size, a spread or a traction force-speed ratio of the transmission device according to the invention can be increased. Thus, compared with transmission devices with secondarily coupled power splitting, known per se, the transmission device according to the present invention can be made more compactly and inexpensively without restricting to an undesirable extent a torque to be provided in the area of a transmission output or a traction force to be provided in the area of a drive output of a vehicle drive-train made with the transmission. The pump that co-operates with the motor can be made comparatively smaller if, in the area of the pump, with a lower-powered drive engine of a vehicle drive-train a smaller torque has to be supported compared with the transmission devices known from the prior art, Furthermore, in a simple manner hydrostatic units of different size in the hydrostatic system offer the possibility of producing the transmission device according to the invention in the form of a simply designed and compact, single-range transmission in which, by appropriate adjustment of the pump and the motor of the hydrostatic system, a transmission ratio can be continuously adjusted, since over the full operating range of a vehicle constructed with the transmission device according to the invention, in the area of a drive output, in each case, a desired traction force can be provided by means of a pump of smaller size compared with the motor, and one that is therefore more compact and inexpensive.

If a vehicle drive-train made with the transmission device according to the invention is constructed with a drive engine, preferably a diesel combustion engine, having a power of around 100 kW, such a vehicle can be operated as necessary with a single transmission ratio range, with a pump having a delivery volume of approximately 120 $cm^3$/rev. and a motor having a displacement volume of around 360 $cm^3$/rev.

In a further compact and inexpensive embodiment of the transmission device according to the invention, between a transmission input and the summing gear system at least two driving direction switching elements are provided, by means of which the vehicle can be shifted between a mode for forward driving and a mode for driving in reverse. By virtue of the arrangement of the driving direction switching elements on the transmission input side relative to the summing gear system, these elements can be made compactly and inexpensively, since in this area of the power flow of the transmission device smaller torques have to be transmitted by the driving direction switching elements than if they were arranged on the transmission output side relative to the summing gear system. Moreover, this arrangement of the driving direction switching elements on the transmission input side offers the possibility of positioning the driving direction switching elements above a filling level of a transmission oil sump of the transmission device according to the invention, whereby power losses in the area of the driving direction switching elements caused by splash losses and the like are reduced in a simple manner.

An embodiment of the transmission device according to the invention adapted to an existing fitting space in a vehicle is characterized in that between a transmission output and the summing gear system there are provided at least two driving direction switching elements, by means of which the vehicle can be shifted between a mode for forward driving and a mode for driving in reverse.

An also compact and inexpensive embodiment of the transmission device according to the invention is designed with a summing gear system in the form of a planetary gear assembly having at least three shafts, wherein a first shaft of the planetary gear assembly is functionally connected to the transmission input, the second shaft of the planetary gear assembly is connected to the pump and a third shaft of the planetary gear assembly is connected to the motor and the transmission output.

In a preferred embodiment of the transmission device according to the invention, the first shaft of the planetary gear assembly is a planetary carrier, the second shaft of the planetary gear assembly is a sun gear and the third shaft of the planetary gear assembly is a ring gear, the gear assembly preferably being designed as a plus planetary gearset.

However, depending on the application case involved, it is also possible for the shafts formed as the planetary carrier, the sun gear or the ring gear of the planetary gear assembly to be coupled, respectively, to the transmission input, the pump or the motor and the transmission output.

In order to be able to vary the transmission ratio of the transmission device according to the invention continuously within as wide a range of transmission ratios as possible, in an advantageous embodiment of the transmission device a displacement volume of the motor and a delivery volume of the pump of the hydrostatic system can be varied in a range from 0% to 100%. When the displacement volume of the motor is at its maximum and the delivery volume of the pump is at its minimum, the torque produced can be conducted completely by way of the first power branch that comprises the hydrostatic system, whereas when the motor displacement volume is a minimum and the delivery volume of the pump is at its maximum, the torque is conducted by way of the second power branch that comprises the mechanical means.

In an embodiment of the transmission device according to the invention that occupies little fitting space in the radial direction, the transmission input and the hydrostatic system are arranged on the same side of the summing gear system.

If the hydrostatic system is positioned on one side of the summing gear system and the transmission input on the other side of the summing gear system, the transmission device according to the invention occupies little fitting space in the axial direction, for example when on the side of the hydrostatic system in the axial direction, a power take-off toward an auxiliary drive output is provided.

In a simply designed and compact embodiment of the transmission device according to the invention, the transmission output is positioned at least in the area of a shaft that is and/or can be brought into functional connection with an output shaft of the motor, this positioning of the transmission output in the area of the output shaft of the motor itself being particularly space-saving since in that case there is no need to provide any additional transmission output shaft axially offset relative to the output shaft of the motor.

If the transmission output is positioned in the area both of a shaft that can be brought into functional connection with the output shaft of the motor and also in the area of a shaft that is functionally connected to the output shaft of the motor, then in a simple manner this provides an offset drive output which, for example, is preferred in the case of backhoe loaders. In this case it can be provided that a drive output to a front axle can be engaged by way of an optional front axle clutch and a drive output in the direction of a rear axle is provided by way of a further drive output shaft arranged axially offset relative to the output shaft of the motor, which is functionally connected to the output shaft of the motor by way of a gearwheel pair.

If in the area of the transmission input at least part of a torque applied from the transmission input side can be split off in the direction of at least one further shaft that can be coupled to an auxiliary drive output, then besides the drive input of a vehicle further equipment too can be supplied with torque as necessary, whereas an arrangement of the hydrostatic system and the further shaft that can be coupled to the auxiliary drive on the same side of the summing gear system and at the same time an arrangement of the transmission input on the opposite side of the summing gear system produces an embodiment of the transmission device that is compact in the axial direction.

When the transmission device is in its fitted position in a vehicle, then in other advantageous embodiments of the transmission device according to the invention the pump and the motor are each arranged in relative positions adapted to the existing space available in order to make the best use of the existing space, so that the transmission device according to the invention can be used in existing vehicle models in a simple manner not entailing elaborate design measures.

For this purpose it can be provided that when the transmission device is fitted in a vehicle, the pump and the motor can be compactly arranged vertically in the vehicle one above the other, or in the longitudinal or transverse direction of the vehicle, essentially next to one another.

If the pump and motor are designed such that they can be pivoted together by means of a double yoke, the transmission device according to the invention can be operated with little control and regulation effort.

In a further advantageous embodiment, the driving direction switching elements are in the form of frictional powershift elements, so as to enable a driving direction change to take place substantially without traction force interruption, and also in order to be able to carry out so-termed reversing processes to the desired extent.

BRIEF DESCRIPTION OF THE DRAWINGS

Further advantages and advantageous further developments of the invention emerge from the example embodiments whose principle is described with reference to the drawings, which show.

DETAILED DESCRIPTION OF THE PREFERRED EMBODIMENTS

Figure 1:
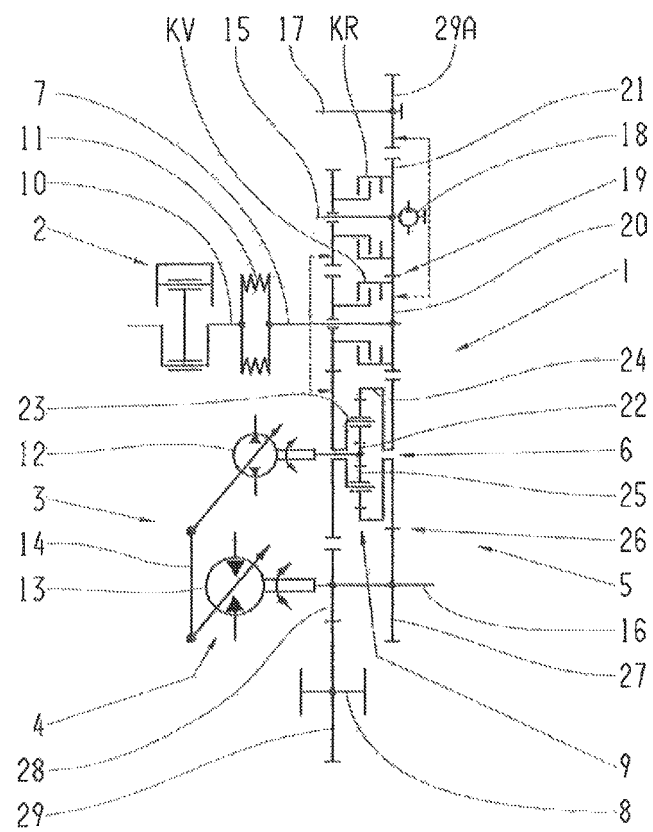
FIG. 1: A gearing layout of a first embodiment of the transmission device according to the invention with secondarily coupled power splitting.

FIG. 1 shows a gearing layout of a transmission device 1 with secondarily coupled power splitting. Part of a torque delivered by a drive engine 2 in this case in the form of an internal combustion engine, preferably a diesel engine, can be conducted in a first power branch 3 by way of a hydrostatic system 4 and the other part of the torque can be conducted in a second power branch 5 by way of a mechanical system 6, between a transmission input or transmission input shaft 7 and a transmission output or transmission output shaft 8. The two power branches 3 and 5 are functionally connected by way of a summing gear system in the form of a planetary gear assembly.

Between an output shaft 10 of the drive engine 2 and the transmission input shaft 7 there is arranged a so-termed oscillation damper 11, by means of which rotation irregularities in the area of the drive engine 2 are damped and only passed on to a smaller extent to the transmission device 1 and into the remainder of the drive-train of a vehicle or building-site machine.

The transmission device 1 is designed with a driving range for forward driving and one for reverse driving, which can be engaged or disengaged by means of driving direction switching elements KR and KV. The hydrostatic system 4 of the first power branch 3 comprises a pump 12 and a motor 13 functionally connected thereto by way of a hydraulic circuit not shown in detail in the drawing, these being adjusted by means of a common yoke 14 and being designed as oblique-axis units.

Depending on the application concerned, however, it is also possible for the pump and the motor to be adjustable independently of one another and to have some other, also suitable structure.

In addition the transmission device 1 is designed as a countershaft transmission with a plurality of countershafts 15 to 17, a distance apart in the redial direction, such that the transmission device 1 takes up little space in the axial direction but occupies more fitting space in the radial direction or vertical direction of the vehicle, so that in this way an axial distance between the output shaft 10 of the drive engine 2 or the transmission input shaft 7 and from drive axles of a vehicle in the form of a stacker, wheel loader or the like, for example, can be bridged.

Between the transmission input 7 and the planetary gear assembly 9 are provided the two driving direction switching elements KV and KR in the form of frictional powershift elements, by means of which a shift between a forward driving mode and a reverse driving mode can be carried out. On the countershaft 15 associated with the driving direction switching element KR for driving in reverse there is arranged a gear pump 18 which, like the countershaft 15 itself, can be driven by the transmission input shaft 7 by way of a gearwheel pair 19.

The gear ratio of the gearwheel pair 19, which consists of a first gearwheel 20 in the form of a spur gear connected in a rotationally fixed manner to the transmission input shaft 7 and a second gearwheel 21, is in this case such that in the direction of the countershaft 15 the rotational speed of the transmission input shaft 7 is accelerated. Thereby, the gear pump 18 rotates at a speed around 20% higher that the drive engine 2 and can be made smaller by virtue of this design of the transmission device 1 compared with a gear pump arranged directly on the transmission input shaft 7.

Besides the gear pump 18, in the area of the countershaft 15 a further power take-off can be provided, which is used for actuating the working equipment of a building-site vehicle preferably in the form of a backhoe loader or suchlike, or a stacker. In such a case, a hydraulic cylinder arranged in an open hydraulic circuit, by means of which for example a loading scoop, a lifting device of a stacker or the like can be actuated, can be supplied with the requisite working pressure by way of the countershaft and a further pump device that can be driven by it, In the example embodiment shown in FIG. 1, the auxiliary drive can be coupled to the transmission device 1 in the area of the countershaft 15 on the side of the transmission device 1 facing away from the drive engine 2, by means of which auxiliary drive any other consumers can also be acted upon by torque.

By means of the gear pump 18, besides the hydraulic circuit that connects the pump 12 and the motor 13 of the hydrostatic system 4 to one another, which circuit is in the form of a closed circuit, a lubricating and cooling circuit can also be supplied with hydraulic fluid. In addition the driving direction switching elements KR and KV can also be supplied with hydraulic working pressure by the gear pump 18 and thereby changed from an essentially open operating condition to an essentially fully closed operating condition.

The planetary gear assembly designed as a simple planetary gearset comprises three shafts 22 to 24, wherein a first shaft 22 is a sun gear, a second shaft 23 is a planetary carrier and a third shaft 24 is a ring gear. The transmission input shaft 7 can be brought into functional connection via the driving direction switching elements KR and KV with the planetary carrier 23 of the planetary gear assembly 9, whereas the pump 12 of the hydrostatic 4 is connected to the sun gear 22 of the planetary gear assembly 9. Planetary gearwheels 25 mounted to rotate on the planetary carrier 23 mesh both with the sun gear 22 and with the ring gear 24, so that torque conducted from the transmission input shaft 7 via the driving direction switching element KV or KR toward the planetary carrier 23 can be passed on by way of the sun gear 22 toward the pump 12 and by way of the planetary gearwheels 25 and the ring gear 24, via a further gearwheel pair 26, toward the further countershaft 16.

If the motor 13 is at rest while the pump 12 is rotating at maximum speed, then the displacement volume of the motor 13 is a maximum whereas the delivery volume of the pump 12 is zero. The drive power of the drive engine 2 is then transmitted fully hydrostatically via the transmission device 1, and this corresponds to a first limit of the driving range of the transmission device 1. The second limit of the driving range of the transmission device 1 occurs when the pump 12 is at rest and the rotational speed of the motor 13 is maximum, so that the displacement volume of the motor 13 is zero and the delivery volume of the pump 12 has its maximum value. In this operating condition of the hydrostatic system 4, the drive power of the drive engine 2 is transmitted via the transmission device 1 between the transmission input shaft 7 and the transmission output shaft 8 purely by mechanical means.

Depending on a set displacement volume of the motor 13 and also adjustable delivery volume of the pump 12, at least part of the torque applied by the drive engine 2 can be passed on toward the transmission output 8 by way of the ring gear 24 of the planetary gear assembly 9 via the second power branch 5 that comprises the mechanical means 6, and the remaining part via the first power branch 3.

In the present case the second countershaft 16 is the motor output shaft of the motor 13, which besides a gearwheel 27 of the second gearwheel pair 26 also has a further fixed wheel 28, which in turn meshes with a further fixed wheel 29 on the transmission output shaft 8, In addition the gearwheel 20, which is connected as a rotationally fixed wheel to the transmission input shaft 7, meshes with a fixed wheel 29A of the third countershaft 17 in the area of which, in turn, a power take-off in the direction toward a further auxiliary drive can be provided in order to be able to drive other equipment of a vehicle preferably in the form of a fork-lift, a building vehicle or the like.

In the present case the motor 13 functionally connected to the ring gear 24 is made larger than the pump 12 coupled to the sun gear 22, the motor 13 having a displacement volume of around 360 $cm^3$/rev, and the pump 12 having, for example, a delivery volume of 120 $cm^3$/rev. when the maximum power of the drive engine 2 amounts to around 100 kW. Owing to the differently designed sizes of the motor 13 and the pump 12, the spread, or a traction force-speed ratio, is larger compared with when the hydraulic units of a hydrostatic system are made the same size. In the area of the pump 12, owing to the comparatively low maximum power of the drive engine 2 only a smaller torque has to be supported, so the pump 12 can be made less powerful. However, in order to be able to produce a traction force as large as possible in the area of the transmission output shaft 8, in the present case a correspondingly large-volume hydraulic motor is used.

The different designs of the motor 13 and pump 12 can be realized easily when, as shown, the transmission device 1 has only one transmission ratio range and the pump 12 and motor 13 are only operated in two so-termed quadrants. In contrast, hydrostatic units of continuously power-splitting transmissions, owing to their alternating functional modes with a plurality of transmission ranges, are operated in four quadrants so that they must necessarily be of the same size.

If the transmission device 1 according to FIG. 1 is used for example in a fork-lift that has only one driven vehicle axle, the transmission output shaft 8 of the transmission device 1 according to FIG. 1 is not needed and in a space-saving manner the drive output can be connected to the transmission device 1 in the area of the second countershaft 16.

Figure 2:
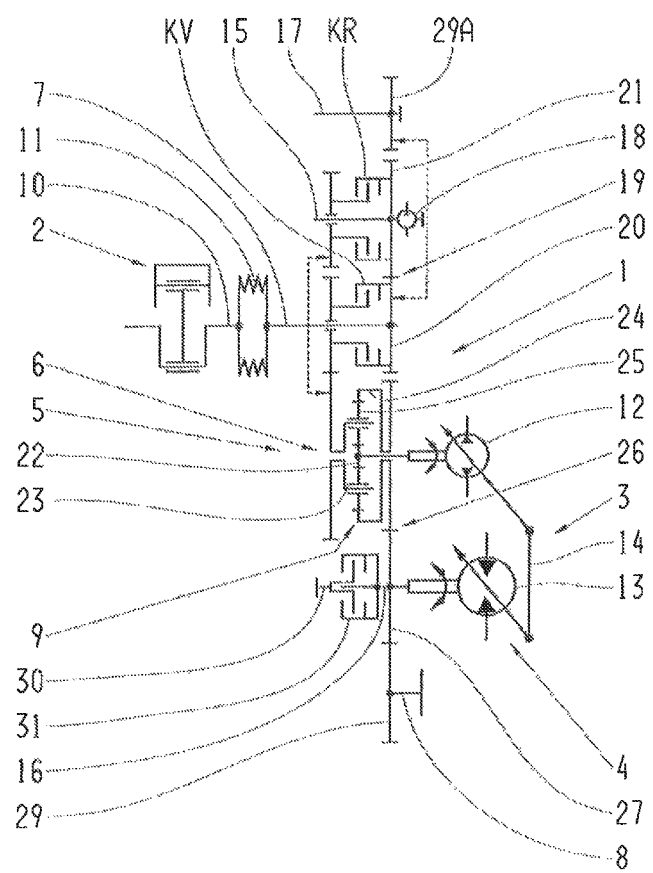
FIG. 2: A representation corresponding to FIG. 1, showing a second embodiment of the transmission device according to the invention.

FIG. 2 shows a representation corresponding to that of FIG. 1, illustrating a second example embodiment of the transmission device 1, which differs only in some areas from the first example embodiment in FIG. 1. For that reason and for the sake of simplicity, the description below will relate only to the differences between the two example embodiments, whereas for the other functional modes of the transmission device 1 of FIG. 2, reference should be made to the description relating to FIG. 1, given above.

In the second example embodiment of the transmission device 1 as shown in FIG. 2, the hydrostatic unit 4 is provided on one side of the planetary gear assembly 9 whereas the transmission input shaft 7 extends on the side of the planetary gear assembly 9 opposite to this. This means that the hydrostatic system 4 and the torque take-off toward an auxiliary drive are provided in the area of the first countershaft 15 on the same side of the planetary gear assembly 9 and opposite to the transmission input shaft 7, so that the transmission device 1 according to FIG. 2 is characterized by little axial space occupation in the axial direction.

Furthermore, the transmission device 1 according to FIG. 2 is designed with a drive output offset in the radial direction, since part of the transmission output torque can be conducted out of the transmission device 1 by way of the transmission output shaft 8 axially offset relative to the countershaft 16 and a further part via a further transmission output shaft 30 arranged coaxially with the countershaft 16 and output shaft of the motor 13. In this case the transmission output shaft 30 can be brought into functional connection with the second countershaft 16 by means of a shifting element 31 in the form of a friction clutch, so that the part of the transmission output torque of the transmission device 1 that can be conducted by this further transmission output shaft 30 can in addition be varied as a function of the transmission capacity of the shifting element 31.

This, for example, provides the possibility that by way of the transmission output shaft 8, torque is conducted toward a rear vehicle axle of a backhoe loader, while drive torque can be transmitted to a front vehicle axle of a backhoe loader via the engageable further transmission output shaft 30.

Figure 3:
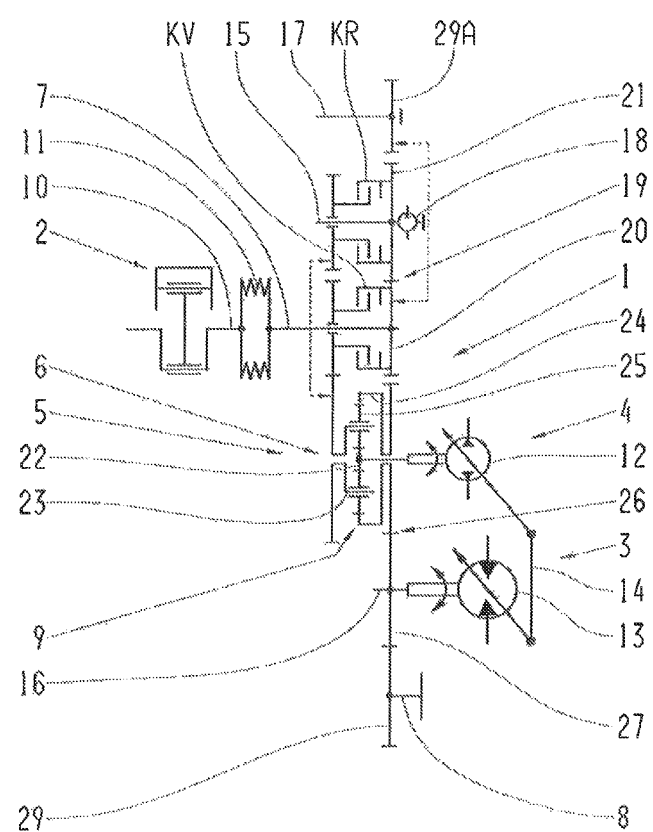
FIG. 3: A representation corresponding to FIG. 1, showing a third embodiment of the transmission device according to the invention.

FIG. 3 shows a gearing layout of a third embodiment of the transmission device 1 which corresponds in its essentials to the second embodiment of the transmission device 1 shown in FIG. 2. The transmission device 1 according to FIG. 3 is made without the shifting element 31 and the further transmission output shaft 30 of the transmission device 1 according to FIG. 2. The transmission device 1 according to FIG. 3 can only be coupled to the drive output in the area of the transmission output shaft 8 on the side of the transmission device 1 opposite to the drive engine 2, as preferred in conventional forklift drives.

Figure 4:
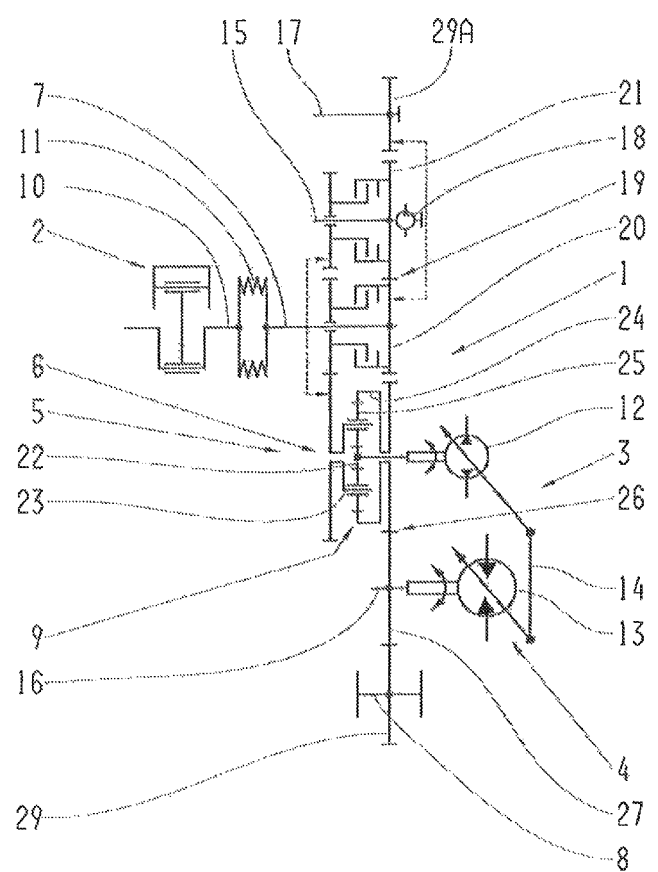
FIG. 4: A representation corresponding to FIG. 1, showing a fourth embodiment of the transmission device according to the invention.

In the fourth example embodiment of the transmission device 1 shown in FIG. 4, as in the second and third embodiments of the transmission device 1 according to FIGS. 2 and 3, the hydrostatic system 4 is arranged on one side of the planetary gear assembly 9, while the transmission input shaft 7 is arranged on the other side of the planetary gear assembly 9 and extends toward the drive engine 2. In the area of the transmission output or transmission output shaft 8, the transmission device 1 according to FIG. 4 corresponds essentially to the first embodiment of the transmission device 1 according to FIG. 1.

In all the embodiments of the transmission device 1 shown in the drawings it is possible, when the transmission device 1 is in its fitted position, to arrange the hydrostatic system 4 vertically, i.e. one above the other as seen in the vehicle's upward direction, or horizontally in other words next to one another as viewed in the transverse or longitudinal direction of the vehicle, and in such a vertical arrangement the pump 12 is positioned above the motor 13. Particularly with an arrangement of the hydrostatic system 4 in accordance with FIGS. 2 to 4, the drive engine 2 and the transmission device 1 can be built on directly.

INDEXES

1 Transmission device
2 Drive engine
3 First power branch
4 Hydrostatic system
5 Second power branch
6 Mechanical means
7 Transmission input shaft, transmission input
8 Transmission output shaft, transmission output
9 Summing gear system, planetary gear assembly
10 Output shaft of the drive device
11 Oscillation damper
12 Pump
13 Motor
14 Yoke
15 to 17 Countershaft
18 Gear pump
19 Gearwheel pair
20 Gearwheel
21 Gearwheel
22 Sun gear
23 Planetary carrier
24 Ring gear
25 Planetary gearwheel
26 Gearwheel pair
27 Gearwheel
28 Fixed wheel
29 Fixed wheel
29A Fixed wheel
30 Further transmission output shaft
31 Shifting element

The invention claimed is:

1. A transmission device (1) with secondarily coupled power spatting, wherein drive torque is transmitted to the transmission device by a transmission input and a first part of the drive torque is conducted in a first power branch (3) at least by way of a hydrostatic system (4) and another part of the drive torque is conducted in a second power branch (5), between the transmission input (7) and a transmission output (8), via a mechanical system (6);
the hydrostatic system (4) of the first power branch (3) comprises at least one pump (12) and at least one motor (13) functionally connected thereto by way of a hydraulic circuit, the at least one pump having a delivery volume per revolution thereof that is less than a displacement volume of the at least one motor per revolution thereof;
both of the at least one pump (12) and the at least one motor (13) are adjustable by a yoke;
the first and the second power branches (3, 5) are summable by a summing gear system (9);
the summing gear system (9) is a planetary gear assembly having first, second and third shafts (22, 23, 24) that are aligned along an axis, the first shaft (23) of the planetary gear assembly (9) is functionally connected to the transmission input (7), the second shaft (22) of the planetary gear assembly (9) is functionally connected to the pump (12) and the third shaft (24) of the planetary gear assembly (9) is functionally connected to the motor (13) and the transmission output (8), and
the transmission device has only one transmission ratio range, and a transmission ratio within the transmission ratio range is continuously variable by the hydrostatic system (4).

2. The transmission device according to claim 1, wherein at least two driving direction switching elements (KR, KV) are provided, between the transmission input (7) and the summing gear system (9), and the transmission output is rotatable in a first rotational direction to facilitate forward driving and a second rotational direction to facilitate reverse driving, and the at least two driving direction switching elements are selectively engaged and disengaged to switch rotation of the transmission output between the first and the second rotational directions.

3. The transmission device according to claim 1, wherein at least two driving direction switching elements are provided, between the transmission output and the summing gear system, and a vehicle the transmission output shaft is rotatable in a first rotational direction to facilitate forward driving and a second rotational direction to facilitate reverse driving, and the at least two driving direction switching elements are selectively engaged and disengaged to switch rotation of the transmission output between the first and the second rotational directions.

4. The transmission device according to claim 1, wherein the first shaft (23) of the planetary gear assembly (9) is a planetary carrier and the drive torque is input in the planetary gear assembly by the first shaft, the second shaft (22) of the planetary gear assembly (9) is a sun gear, and the third shaft (24) of the planetary gear assembly (9) is a ring gear and the drive torque is output from the planetary gear assembly by the ring gear.

5. The transmission device according to claim 1, wherein the displacement volume of the motor (13) is 360 cm³/rev and the delivery volume of the pump (12) is 120 cm³/rev and the displacement volume of the motor and the delivery volume of the pump are adjustable such that, based on relative rotational speeds of the motor and the pump, when the displacement volume of the motor (13) is at a maximum and the delivery volume of the pump (12) is at a minimum, the drive torque is transmitted completely via the first power branch (3) comprising the hydrostatic system (4), whereas when the displacement volume of the motor (13) is at a minimum and the delivery volume of the pump (12) is at a maximum, the drive torque is transmitted completely via the second power branch (5) comprising the mechanical system (6).

6. The transmission device according to claim 1, wherein the hydrostatic system (4) and the transmission input (7) are both arranged, with respect to a flow of the drive torque from the transmission input to the transmission output, on an upstream side of the summing gear system (9).

7. The transmission device according to claim 1, wherein the hydrostatic system (4) is arranged, with respect to a flow of the drive torque from the transmission input to the transmission output, on an output side of the summing gear system (9) and the transmission input (7) is arranged on an input side of the summing gear system (9), both the pump and the motor are arranged on an opposite axial side of the summing gear system from a drive engine.

8. The transmission device according to claim 1, wherein the transmission output (8) is axially offset from a transmission output shaft (30) that is coaxial with and either functionally connected to or functionally connectable with an output shaft (16) of the motor (13), a first gearwheel is continuously connected to the output shaft of the motor, and a second gearwheel is continuously connected to the transmission output and the first gearwheel directly meshes with the second gearwheel.

9. The transmission device according to claim 1, wherein at least a further part of the drive torque transmitted by the transmission input is split off, from the transmission input (7), toward at least one further shaft (15, 17) that is couplable to an auxiliary drive.

10. The transmission device according to claim 1, wherein the second shaft of the planetary gear assembly is connected to the pump (12), and the motor (13) has an output shaft, the third shaft of the planetary gear assembly forms an output of the planetary gear assembly and is continuously connected to the output shaft of the motor and the transmission output.

11. The transmission device according to claim 1, wherein the transmission device (1) has only two switching elements, and the two switching elements are located upstream of the summing gear system in relation to a flow of the drive torque from the transmission input to the transmission output.

12. The transmission device according to claim 2, wherein the driving direction switching elements (KV, KR) are frictional powershift elements and, with respect to a flow of the drive torque from the transmission input to the transmission output, downstream from an output of the planetary gear assembly, the transmission device is free of further switching elements.

13. A transmission device of a vehicle with secondarily coupled power splitting which transmits a first portion of an applied torque in a first power branch at least by way of a hydrostatic system, and transmits another portion of the applied torque in a second power branch, between a transmission input and a transmission output, via a mechanical system;
the hydrostatic system of the first power branch comprises at least one pump and at least one motor;
the motor is functionally connected to the pump by a hydraulic circuit,
both of the motor and the pump are adjustable by a yoke, the pump having a delivery volume per revolution thereof, and the motor having a displacement volume per revolution thereof, and the displacement volume of the motor per revolution thereof is greater than the delivery volume of the pump per revolution thereof;
torque transmitted by the first and the second power branches are summable by a summing gear system;

the summing gear system is a planetary gear assembly having first, second and third shafts, the first shaft of the planetary gear assembly is a carrier of the planetary gear assembly and is functionally connected to the transmission input such that the applied torque is input in the planetary gear assembly by the first shaft, the second shaft of the planetary gear assembly is connected to the pump and forms a sun gear of the planetary gear assembly, and the third shaft of the planetary gear assembly is a ring gear of the planetary gear assembly that directly engages a gearwheel rotationally fixed to an output shaft of the motor, the gearwheel of the output shaft of the motor directly engages another gearwheel that is rotationally fixed to the transmission output, and the third shaft of the planetary gear assembly forming a torque output of the planetary gear assembly, the transmission input, the transmission output and the summing gear system are aligned with respect to each other along parallel axes, and the pump and the motor are both arranged on an axial side of the summation gearset that is opposite a drive engine, and the transmission device has only one transmission ratio range with a transmission ratio, and the transmission ratio is continuously variable within the transmission ratio range by way of the hydrostatic system.

* * * * *